United States Patent [19]

Tamai

[11] Patent Number: 5,747,969

[45] Date of Patent: May 5, 1998

[54] METHOD OF CHARGING A RECHARGEABLE BATTERY WITH PULSES OF A PREDETERMINED AMOUNT OF CHARGE

[75] Inventor: Mikitaka Tamai, Sumoto, Japan

[73] Assignee: Sanyo Electric Co., Ltd., Osaka, Japan

[21] Appl. No.: 748,631

[22] Filed: Nov. 13, 1996

[30] Foreign Application Priority Data

Nov. 21, 1995 [JP] Japan ................................. 7-302950

[51] Int. Cl.$^6$ ........................... H01M 10/44; H01M 10/46
[52] U.S. Cl. ................................. 320/141; 320/145
[58] Field of Search .......................... 320/21, 22, 23, 320/30, 31, 32, 39, 40, 35, 37

[56] References Cited

U.S. PATENT DOCUMENTS

| | | | |
|---|---|---|---|
| 5,367,244 | 11/1994 | Rose et al. | 320/23 |
| 5,442,274 | 8/1995 | Tamai | 320/23 |
| 5,606,240 | 2/1997 | Kokuga et al. | 320/32 |
| 5,617,007 | 4/1997 | Keidl et al. | 320/22 |

FOREIGN PATENT DOCUMENTS

| | | |
|---|---|---|
| 2-119539 | 5/1990 | Japan . |
| 6-113474 | 4/1994 | Japan . |

*Primary Examiner*—Edward Tso
*Attorney, Agent, or Firm*—Wenderoth, Lind & Ponack

[57] ABSTRACT

The charging method repeatedly charges and suspends charging to pulse charge a rechargeable battery. Charging is suspended only after a given amount of charge is transferred to the battery. Battery voltage is measured during the period of suspended charging, and charging is resumed only after the voltage of the battery drops below a first prescribed voltage. This situation is continuously repeated to pulse charge a rechargeable battery.

35 Claims, 4 Drawing Sheets

METHOD OF CHARGING A RECHARGEABLE BATTERY WITH PULSES OF A PREDETERMINED AMOUNT OF CHARGE

BACKGROUND OF THE INVENTION

This invention relates to a pulse charging method which repeatedly charges and suspends charging of a rechargeable battery. In particular, this invention relates to a charging method ideally suited for charging rechargeable batteries such as lead storage batteries or lithium ion rechargeable batteries.

Constant-current charging followed by constant-voltage charging is a typical method of charging one type of rechargeable battery, namely the lithium ion rechargeable battery. In this method, constant-current charging is performed until battery voltage reaches a pre-set value (for example, 4.10V). After the pre-set voltage is reached, charging is switched to constant-voltage charging at the pre-set voltage to avoid having the battery voltage rise above that pre-set voltage. By increasing the charging current during the constant-current charging, the time needed to achieve full charge can be reduced. However, even though the constant-current charging time is reduced by increasing the charging current, it does not follow that the more the charging current is increased the more the charging time will be reduced. This case of diminishing returns results from the direct current (DC) resistive component of the charging cutoff circuit. Further, when the charging current is increased to a certain level, degradation in battery performance becomes an issue.

Japanese Non-examined Patent Publication No. 2-119539 issued May 7, 1990 discloses a charging method that aims at reducing charging time by raising the final battery voltage attained by constant-current charging to a voltage (for example 4.40V) above the pre-set voltage (4.10V) for subsequent constant-voltage charging. In this method, since the final battery voltage after the initial constant-current charging is increased, the amount of charge transferred to the battery during the constant-current charging is increased and the total charging time can be reduced. Furthermore, the more the battery voltage is increased after constant-current charging, the more the charging time can be reduced. However, when the voltage setting for constant-current charging is increased, the detrimental effect of lithium ion rechargeable battery performance degradation is caused.

With the objective of eliminating this detrimental effect, the present inventor developed pulse charging technology which reduced charging time and prevented battery performance degradation (Japanese Non-examined Patent Publication No. 6-113474 issued Apr. 22, 1994). In the charging method disclosed, constant-current charging is initially performed until battery voltage reaches a first voltage (for example, 4.40V). Subsequently, pulse charging is performed, which alternates between constant-voltage charging at the first voltage and suspension of charging. After pulse charging is completed, the battery is charged to full charge by constant-voltage charging at a second voltage (4.10V) which is less than the first voltage.

In the pulse charging step of this method, charging is performed at the first voltage, which is higher than the rechargeable battery voltage at full charge. However, since the battery is alternately charged and suspended from charging, battery performance degradation is prevented. Furthermore, since charging is performed at the first voltage, which is higher than the second voltage, charging time is reduced. However, charging circuitry becomes complex due to the requirement of a constant-current charging circuit, a pulse charging circuit, and a constant-voltage charging circuit.

Therefore, as described above, methods for rapidly charging rechargeable batteries such as lithium ion rechargeable batteries have been developed, but none of these methods are fully satisfactory.

It is thus an object of the present invention to present a rechargeable battery charging method that does not invite battery degradation due to over-charging.

The above and further objects and features of the invention will more fully be apparent from the following detailed description with accompanying drawings.

SUMMARY OF THE INVENTION

The battery charging method of the present invention is a pulse charging method which alternately charges and suspends charging of a rechargeable battery. Each pulse provides a given amount of charge to the rechargeable battery. After this given amount of charge is provided, charging is suspended. If the battery voltage drops below a first prescribed voltage during the period of charging suspension, battery charging is resumed. This procedure of charging followed by suspension of charging is performed repeatedly so as to pulse charge the rechargeable battery.

Since the pulse charging method of the present invention repeatedly charges the rechargeable battery only by a given amount for each pulse, suspends charging after a pulse, and resumes charging if battery voltage drops below the first prescribed voltage during the period of charging suspension, the rechargeable battery can be rapidly charged in a short period with a simple charging circuit without battery performance degradation.

DETAILED DESCRIPTION OF THE INVENTION

The present invention is described with reference to its embodiments in the following. However, in the present invention, the term "suspension of charging" does not simply apply to the case of zero charging current. It also has the extended meaning that encompasses trickle charging with an extremely small charging current, constant-voltage charging at a first prescribed voltage V1, as well as extremely small amounts of discharging.

First, as described below and in accordance with the wave-form diagram of FIG. 1 which illustrates basic principles, the charging method of the present invention is characterized by pulse charging of a rechargeable battery.

The rechargeable battery is charged with only a given amount of charge for each charging pulse. Specifically, the amount of battery charge (charging current Ic×charging time Ta) corresponding to one pulse is less than or equal to 10% of full charge capacity, preferably less than or equal to 5% of full charge, and still more preferably less than or equal to 1% of full charge. This given amount of charge is not necessarily maintained fixed throughout battery charging, but rather can vary within a range not to exceed 10% of full charge.

For example, if a rechargeable battery has a full charge capacity of 1300 mAh and the constant current charging current Ic is 1 C (=1300 mA), then charging can be performed with the charging period Ta set at or below 360 sec. When charging current is a periodically varying wave-form such as a triangular wave or a sine wave instead of a constant current as shown in FIG. 1, the average current can be taken as the current Ic mentioned above and the charging period Ta can be suitably calculated. On the other hand for non-periodically varying wave-forms, battery charge can be determined by continuously measuring charging current while time integrating that measured charging current over the charging period. Charging can then be performed with this calculated battery charge constrained to no more than 10% of the rechargeable battery's full charge capacity.

After completion of a charging pulse equivalent to a given amount of charge, rechargeable battery charging is suspended. If the rechargeable battery voltage drops to or below the first prescribed voltage V1 (a voltage which will not over-charge the battery, namely the battery's full charge voltage, for example 4.10V/cell) during this period of suspended charging, pulse charging of a given amount of charge is performed again. Subsequently, this procedure of charging of a given amount of charge followed by suspension of charging is repeated thus pulse charging the rechargeable battery.

Figure 1:
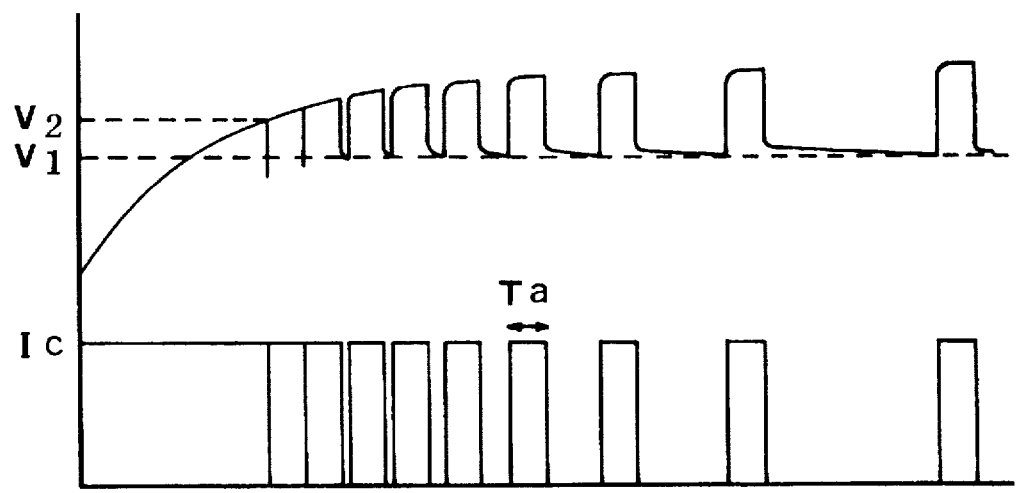
FIG. 1 is a wave-form diagram illustrating the basic principle of the present invention.

In FIG. 1 at the end of a period of suspended charging, as soon as battery voltage drops to or below the first prescribed voltage V1, charging is immediately resumed. However, to allow accurate battery voltage measurement and prevent improper circuit operation, it is desirable for the period of suspended charging to be equal to or longer than a set minimum time period. Charging can then be resumed after passage of this minimum time period.

In FIG. 1, pulse charging is performed after continuous charging, up to a second prescribed voltage V2 (for example, 4.15V/cell), is accomplished. However, the pulse charging of the rechargeable battery may also start immediately after charging has begun. Further, this second prescribed voltage V2 may be set to be the same as the first prescribed voltage V1, higher than the first prescribed voltage V1, or lower than the first prescribed voltage V1.

Figure 2:
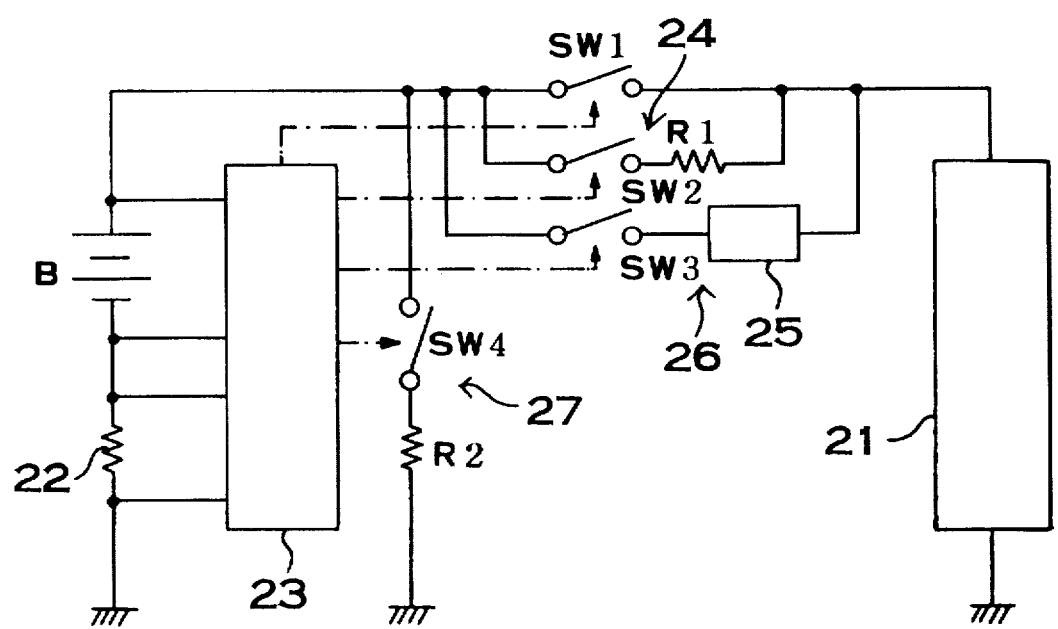
FIG. 2 is an abbreviated block diagram showing the basic circuit of the present invention.

Turning to FIG. 2, an abbreviated circuit diagram to implement the basic principles of this charging method is shown. This circuit is provided with a DC power supply 21, a rechargeable battery B, a first switch SW1, a charging current measurement circuit 22, and a charging control circuit 23. As shown in FIG. 2, a trickle charging circuit 24 and a constant voltage circuit are connected in parallel with the first switch SW1. The trickle charging circuit 24 includes a second switch SW2 and a current limiting resistor R1, and the constant-voltage charging circuit 26 includes a third switch SW3 and a constant voltage circuit 25. Still further, a discharge circuit 27, including a fourth switch SW4 and a discharge resistor R2, is connected in parallel with the rechargeable battery B.

Any combination of these three circuits, i.e., the trickle charging circuit 24, the constant voltage charging circuit 26, or the discharge circuit 27, may be provided. The selection depends on the type of operation desired to be performed during the suspension of charging, namely, trickle charging with an extremely small charging current, constant voltage charging at the first prescribed voltage V1, or very slight discharge of the rechargeable battery.

The DC power supply 21 converts 100V–120V commercially supplied alternating current (AC) to DC for charging the rechargeable battery B. The voltage and current characteristics of the DC power supply 21 are not limited to any particular values. However, if the supply voltage is set to a value that does not over-charge the rechargeable battery (for example, approximately 4.35V/cell for a rechargeable battery with a full charge voltage of 4.10V), then over-charging will not occur even if the charging control circuit malfunctions.

The first switch SW1 through the fourth switch SW4 are semiconductor switching devices such as bipolar transistors or metal oxide semiconductor field effect transistors (MOSFET). When the first switch SW1 is on, the rechargeable battery B is charged. When the first switch SW1 is off, charging of the rechargeable battery B is suspended.

When the first switch SW1 is off and the second switch SW2 is on, the rechargeable battery B is trickle charged. When the first switch SW1 is off and the third switch SW3 is on, the rechargeable battery B is constant-voltage charged at the first prescribed voltage V1. Finally, when the first switch SW1 is off and the fourth switch SW4 is on, the rechargeable battery B is discharged at an extremely small current.

The charging control circuit 23 measures rechargeable battery B voltage. As shown in FIG. 2, battery voltage may be measured across the total series connection of a plurality of batteries. However, in cases where battery to battery variation is possible, it is desirable to measure each individual battery cell and control the charging on the basis of the cell with the highest voltage in order to reliably prevent over-charging of each individual rechargeable battery. Further, the charging control circuit 23 computes the amount of charging or charging capacity based on the charging current measured by the charging current measurement circuit 22. The charging control circuit 23 then controls the switches SW1 through SW4 in response to the battery voltage and the amount of charging.

The operation of this circuit is most simply described by assuming a charging current of zero during the period of suspended charging. First, with the first switch SW1 in the on state, the rechargeable battery B is charged until the battery voltage reaches the second prescribed voltage V2 (4.15V/cell). After the voltage of rechargeable battery B reaches the second prescribed voltage V2, the battery is further charged only by a given amount of charge, namely, the amount of charge of one pulse, e.g., ≦10% of the battery's full charge capacity. For the case of a constant-current output from the DC power supply 1, the amount of further charging is controlled by controlling the charging time. For the case of a variable current output, the charging control circuit 23 integrates over time the charging current measured by the charging current measurement circuit 22 to determine the amount of charge.

When the further charging of the amount of one pulse is complete, charging of the rechargeable battery B is suspended with the first switch SW1 in the off state. When the voltage of the battery drops to or below the first prescribed voltage V1 as a result of the suspension of charging, charging by the given amount is resumed. Subsequently, charging and suspension of charging are performed repeatedly, thus pulse charging the rechargeable battery B.

This explains the basic principles of the present invention. However, the level of the first prescribed voltage V1 (and the second prescribed voltage V2) can also be adjusted so as to suitably compensate for the ambient temperature to increase the safety of the present invention another level and prevent battery characteristic degradation. Specifically, when the ambient temperature is low, the prescribed voltages can be increased, and when ambient temperature is high, the prescribed voltages can be decreased. In addition, it is desirable to adjust the given amount of charge of the charging pulse to be greater for low ambient temperature and to be lower for high ambient temperature.

Further, it is desirable to establish a third (or maximum) prescribed voltage V3 (greater than the first prescribed voltage V1). If the voltage of the rechargeable battery reaches this third prescribed voltage V3 during charging, regardless of how much charge has been previously transferred, charging is suspended or restricted, or constant-voltage charging at the third prescribed voltage is performed to avoid over-charging. It is also desirable to adjust this third prescribed voltage V3 to compensate for the ambient temperature by increasing V3 for low ambient temperatures and the decreasing V3 for high ambient temperatures.

Figure 3:
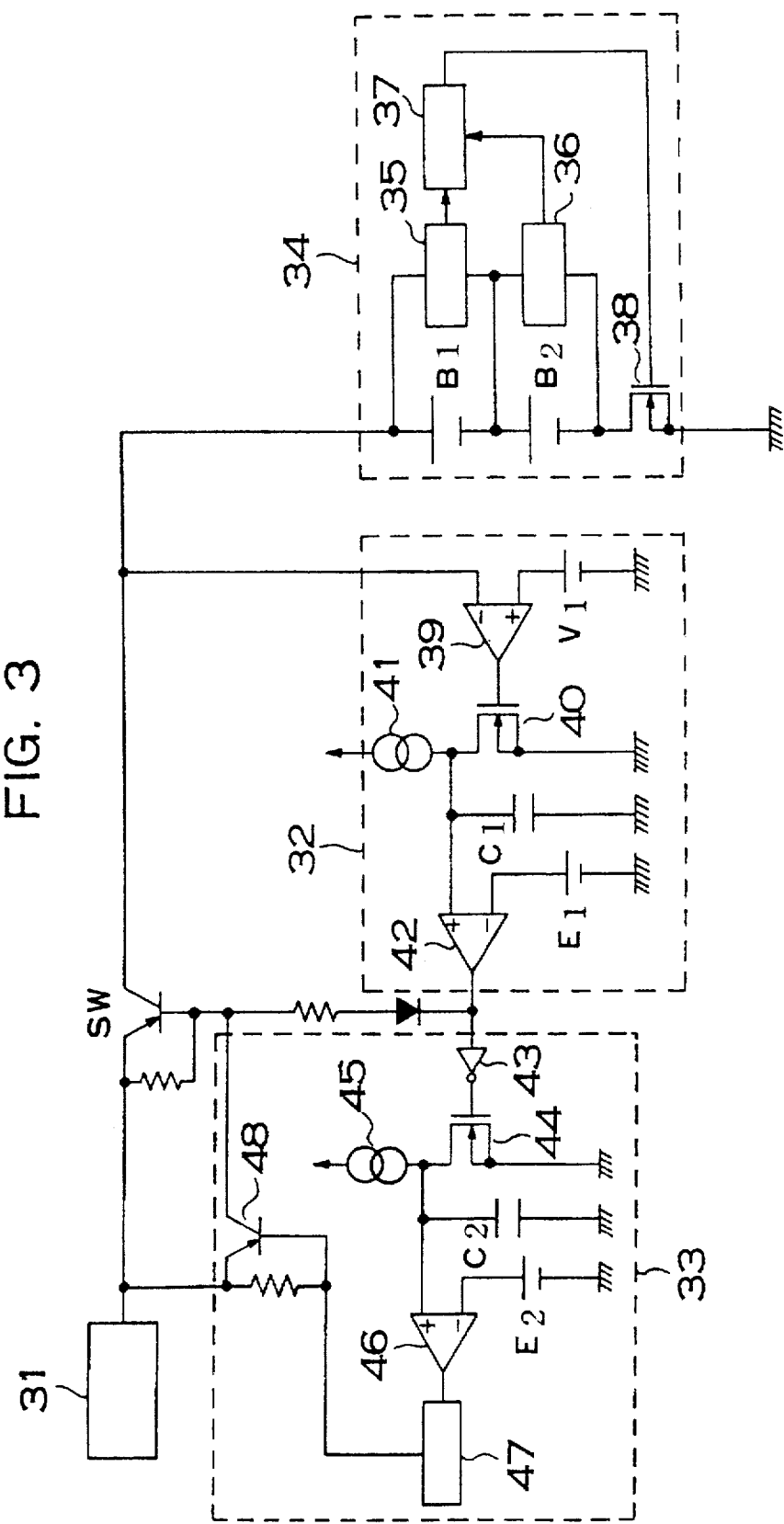
FIG. 3 is a circuit diagram showing the first embodiment of the present invention.

Turning to FIG. 3, we describe the present invention in terms of the more specific first embodiment. In this embodiment pulse charging begins after the voltage of the battery has reached the first prescribed voltage V1 (a voltage corresponding to the above mentioned second prescribed voltage V2).

FIG. 3 shows a charging circuit for a battery pack 34 containing two series connected lithium ion rechargeable batteries B1 and B2. This charging circuit is provided with a DC power supply 31, a switching transistor SW, a charging control circuit 32, and a charge termination control circuit 33.

The DC power supply 31 produces a constant voltage and a constant DC current suitable for charging rechargeable batteries B1 and B2 (for example, 10V of constant voltage and 1.3 A of constant current) from 100V–120V commercial AC. The switching transistor SW is a semiconductor switching device such as a bipolar transistor or MOSFET. When the switching transistor SW is on, rechargeable batteries B1 and B2 are charged by the constant current. When the switching transistor SW is off, the charging of B1 and B2 is suspended. The switching transistor SW is switched on and off to pulse charge the rechargeable batteries B1 and B2.

The battery pack 34 houses an over-charge protection circuit to measure the respective voltages of rechargeable batteries B1 and B2 and protect them from over-charging. The over-charge protection circuit is made up of elements characterized as follows. Voltage measurement circuits 35 and 36 measure the battery voltage of B1 and B2 and generate an over-charge detection signal if battery voltage reaches or exceeds 4.35V (corresponding to the third prescribed voltage mentioned above). A delay circuit 37 outputs a charging shut-off signal if the voltage measurement circuits 35 and 36 issue an over-charge detection signal continuously for 30 msec or more. A MOSFET 38 is connected in series with the rechargeable batteries B1 and B2 and responds to a charging shut-off signal by forbidding charging.

The over-charge protection circuit prevents rechargeable batteries B1 and B2 from over-charging by the following operation. When both rechargeable batteries B1 and B2 have voltages less than or equal to 4.35V, the voltage measurement circuits 35 and 36 do not generate an over-charge detection signal. Consequently, the delay circuit 37 does not output a charging shut-off signal, and the MOSFET 38 does not change to the off state. However, if the battery voltage of at least one of the rechargeable batteries B1 and B2 becomes greater than 4.35V, one of the voltage measurement circuits 35 and 36 will generate an over-charge detection signal. If the over-charge detection signal persists for 30 msec or more, the delay circuit 37 will output a charging shut-off signal and the MOSFET 38 will switch to the off state.

If the battery voltage of at least one of the two rechargeable batteries B1 and B2 is equal to or greater than 4.35V continuously for 30 msec or more, the over-charge protection circuit prevents over-charging by forcing the MOSFET 38 to the off state thus forbidding B1 and B2 from being charged. On the other hand, as long as the voltages of B1 and B2 do not reach or exceed 4.35V, or if either battery's voltage reaches or exceeds 4.35V but for less than 30 msec, then the MOSFET 38 is maintained in the on state.

The charging control circuit 32 switches the switching transistor SW on and off to pulse charge the rechargeable batteries B1 and B2. The charging control circuit 32 is provided with elements characterized as follows. A difference amplifier 39 compares the total voltage of rechargeable batteries B1 and B2 with the first prescribed voltage V1 (8.20V in this embodiment). A MOSFET 40 is switched on or off depending on the output of difference amplifier 39. A capacitor C1 is connected in parallel with MOSFET 40. A constant current source 41 supplies power to capacitor C1 and MOSFET 40. A difference amplifier 42 compares the voltage across the terminals of capacitor C1 with a reference voltage E1. When the output signal from difference amplifier 42 becomes a high voltage level, the switching transistor SW is switched from the on state to the off state.

The charging control circuit 32 compares the total battery voltage of B1 and B2 with the first prescribed voltage V1. However, the charging control circuit 32 may also be constructed to measure the individual battery voltage of each battery B1 and B2 to prevent over-charging due to battery voltage variability. In that case, the voltage of each battery is compared to the first prescribed voltage V1 (4.10V for this case) and if the voltage of either battery reaches the first prescribed voltage V1, the output signal of the difference amplifier 42 goes to the high voltage level.

The charge termination control circuit 33 ends charging of rechargeable batteries B1 and B2 by switching the switching transistor SW to the off state. An inverter 43 inputs the output signal from the difference amplifier 42 and a MOSFET 44 is switched on or off depending on the output from the inverter 43. A capacitor C2 is connected in parallel with MOSFET 44. A constant current source 45 supplies power to capacitor C2 and MOSFET 44. A difference amplifier 46 compares the voltage across the terminals of the capacitor C2 with a reference voltage E2. A latching circuit 47 latches the output signal from the difference amplifier 46, and a transistor 48 is switched on or off depending on the latched signal from the latching circuit 47. If the output signal from the difference amplifier 42 goes high and remains there for a prescribed time interval (for example, 10 sec), the rechargeable batteries B1 and B2 are assumed to be fully charged and the switching transistor SW is switched to the off state. The charging of B1 and B2 is thus completed.

The method of charging for the first embodiment is described below. First the rechargeable batteries B1 and B2 are charged by constant-current charging. When the total battery voltage of B1 and B2 becomes greater than the first prescribed voltage V1, the output signal of difference amplifier 39 goes low and the MOSFET 40 switches to the off state. As a result, the capacitor C1 is charged by the constant current source 41 and after the prescribed time interval, the voltage across the capacitor C1 terminals exceeds the reference voltage E1. The output signal from the difference amplifier 42 then goes high. When the output signal from the difference amplifier 42 goes high, the switching transistor SW is forced into the off state and charging of B1 and B2 is suspended. Therefore, only after the total battery voltage of B1 and B2 becomes larger than the first prescribed voltage V1, and additional charging is performed for a prescribed time interval, is charging suspended.

Here, the prescribed time interval, as previously alluded to, is set for an amount of charge that does not over-charge B1 and B2 and cause battery degradation. The prescribed time interval is set such that the amount of charge to B1 and B2 is ≦10% of the full charge capacity of B1 and B2.

Along with the suspension of charging, the voltage of B1 and B2 drops. When battery voltage drops to the first prescribed voltage V1, the output signal from difference amplifier 39 goes high and MOSFET 40 turns on. Consequently, capacitor C1 discharges through MOSFET 40 and the output signal from difference amplifier 42 goes low. When the output signal from difference amplifier 42 goes low, switching transistor SW is again switched from the off state to the on state and charging is resumed.

As a result of the resumption of charging, the voltage of B1 and B2 again exceeds the first prescribed voltage V1 and, as described previously, charging is again suspended after passage of the prescribed time interval. Subsequently, the rechargeable batteries B1 and B2 are pulse charged until the battery voltage drops to the first prescribed voltage V1.

When the output of difference amplifier 42 goes high, the output of the inverter 43 goes low and MOSFET 44 is turned off. As a result, capacitor C2 is charged by the constant current source 45. However, although difference amplifier 42 output has gone high, it changes back to low in less than 10 sec (namely B1 and B2 charging resumes). Therefore, since MOSFET 44 switches from the off state to the on state, the voltage across the terminals of capacitor C2 does not surpass the reference voltage E2. As a result, the charge termination control circuit 33 does not turn the switching transistor SW off, and the pulse charging of B1 and B2 is continued.

When the output of difference amplifier 42 does persist in the high state for 10 sec or more, the voltage across the terminals of capacitor C2 exceeds the reference voltage E2, and the difference amplifier 46 output signal goes high. When the difference amplifier 46 output signal goes high, the latched signal of the latching circuit 47 goes low. This results in turning on transistor 48 which in turn switches the switching transistor SW to the off state ending the charging of the rechargeable batteries B1 and B2, which are assumed to be fully charged.

Here, instead of immediately ending the charging of B1 and B2 after the latch signal goes low, additional charging for a selected time period or constant voltage charging at the first prescribed voltage V1 may be performed. Further, after completion of this charging, the rechargeable batteries may be discharged a prescribed amount and then once again charged.

Figure 4:
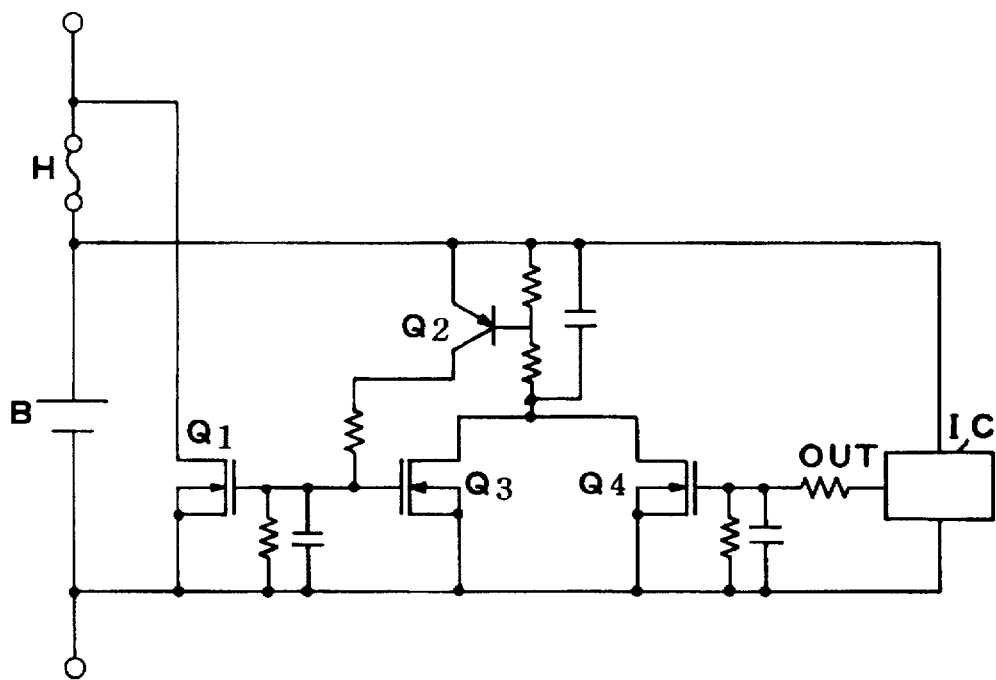
FIG. 4 is a circuit diagram showing another example of the over-charge protection circuit of the first embodiment of the present invention.

Turning to FIG. 4, another embodiment of the over-charge protection circuit housed within the battery pack 34 of the first embodiment is shown. This over-charge protection circuit is provided with a current fuse H connected in series with the rechargeable battery B. A detection circuit IC detects any amount of continuous charging in excess of the given amount of charge when the rechargeable battery voltage is in excess of the first prescribed voltage V1. Switches Q1–Q4 cause the fuse H to blow in response to output from the detection circuit IC.

To detect voltage of rechargeable battery B in excess of the first prescribed voltage V1 and continuous charging in excess of the given amount of charge, the detection circuit IC has a battery voltage measurement section and a charge measurement section. During constant-current charging of rechargeable battery B, the charge measurement section measures the charging time to determine the amount of charge.

In this circuit configuration, if the detection circuit IC detects that the rechargeable battery B voltage is in excess of the first prescribed voltage V1 and the continuous charging is in excess of the given amount of charge, a high level signal is issued from the output terminal OUT of the detection circuit IC. As a consequence, the four switches Q1–Q4 are turned on, switch Q4 remains continuously in the on state, the fuse H is blown, and charging of rechargeable battery B is prevented.

A temperature fuse, a circuit including a thermal device (for example, a heating resistor), or a temperature fuse thermally coupled to a transistor may be used in place of the current fuse H.

Figure 5:
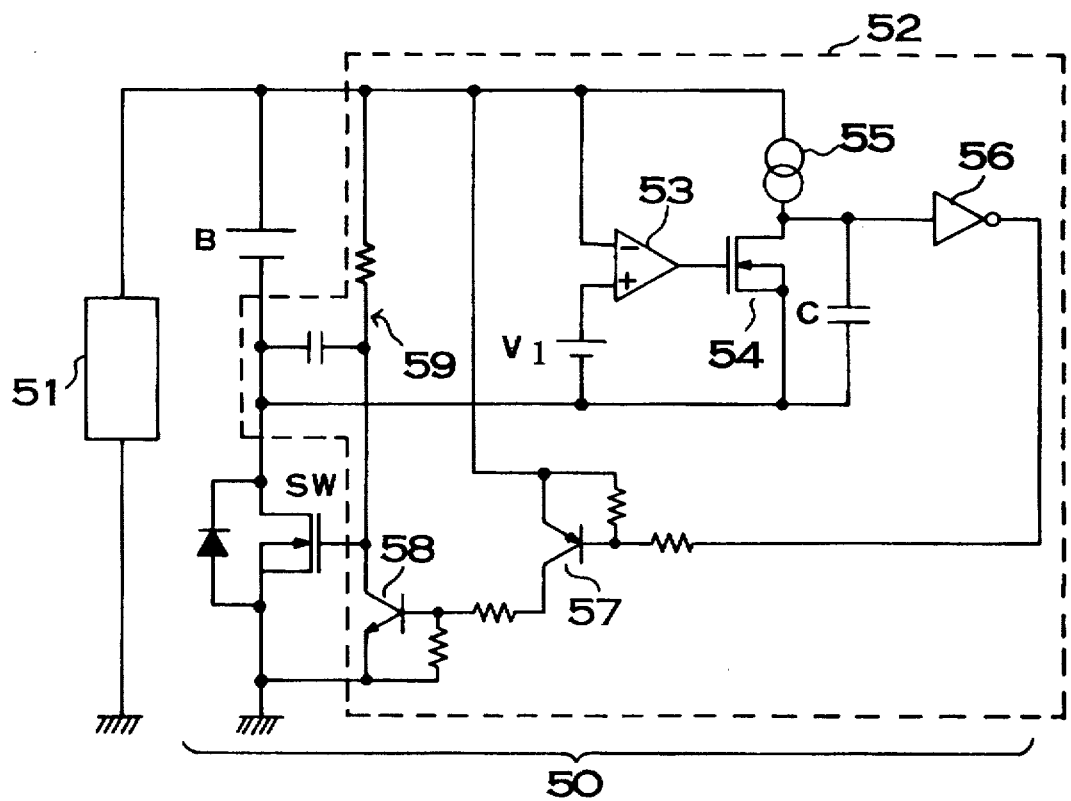
FIG. 5 is a circuit diagram showing the second embodiment of the present invention.

Turning to FIG. 5, the second embodiment of the present invention is shown. In this embodiment as well, pulse charging is performed after rechargeable battery voltage reaches a first prescribed voltage V1.

This charging circuit shows an example of a battery pack 50 which includes a rechargeable battery B and houses a charging control circuit. The charging circuit is provided with a DC power supply 51, a switching transistor SW, and a charging control circuit 52.

The DC power supply 51 generates constant voltage and constant current DC for charging rechargeable battery B (for example, 5V and 1.3 A of constant current) from 100V–120V commercial AC. The switching transistor SW is a semiconductor switching device such as a bipolar transistor or MOSFET which is switched on and off so as to pulse charge the rechargeable battery B.

The charging control circuit 52 switches the switching transistor SW on and off so as to pulse charge the rechargeable battery B. The charging control circuit 52 is provided with a difference amplifier 53 which compares the voltage of rechargeable battery B with the first prescribed voltage V1 (4.10V in this embodiment). A MOSFET 54 is switched on or off depending on the output of difference amplifier 53. A capacitor C is connected in parallel with MOSFET 54. A constant current source 55 supplies power to the capacitor C and MOSFET 54. An inverter 56 outputs a low level signal when the voltage across the capacitor C terminals exceeds its transition threshold voltage. Two stages of transistors 57 and 58 are turned on and off depending on the inverter 56 output signal. An RC integrating circuit 59 is connected to the gate terminal of the switching transistor SW.

The constant current source 55 produces a constant current which is proportional to the voltage of rechargeable battery B. A larger battery voltage produces a larger current. The current source may be configured simply as a resistor.

Figure 6:
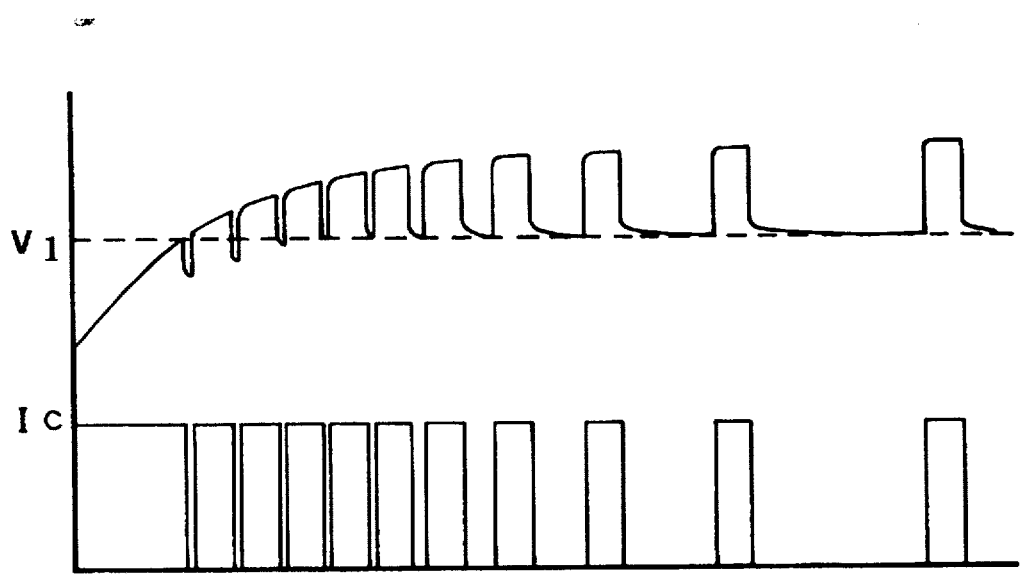
FIG. 6 is a wave-form diagram illustrating the operation of the second embodiment of the present invention.

The following describes the charging method of the second embodiment with reference to the wave-form diagram of FIG. 6. First, the rechargeable battery B is constant current charged. When the voltage of rechargeable battery B exceeds the first prescribed voltage V1, the output signal of difference amplifier 53 goes low, and MOSFET 54 goes to the off state. As a result, capacitor C is charged by the constant current source 55. After a prescribed time elapses, the voltage across the capacitor C rises above the transition threshold of the inverter 56, and the inverter 56 output signal goes low. As a consequence of this, the two transistors 57 and 58 both turn on, the switching transistor SW is forced from the on state to the off state, and charging of the rechargeable battery B is thereby suspended. In other words, from the time the battery voltage rises above the first prescribed voltage V1 until the passage of a prescribed time interval, charging is performed. After that time interval, charging is suspended.

In this embodiment as in the first embodiment, the prescribed time interval is set for an amount of charge that does not over-charge rechargeable battery B causing battery degradation. The prescribed time interval is set such that the amount of charge applied to rechargeable battery B is ≦10% of the full charge capacity of battery B.

When charging is suspended, the voltage of rechargeable battery B drops. When the battery voltage drops to the first prescribed voltage V1, the output signal from difference amplifier 53 goes high and MOSFET 54 turns on. Consequently, capacitor C discharges through MOSFET 54 and the output signal from inverter 56 goes high. When the output signal from inverter 56 goes high, the two transistors 57 and 58 both switch to the off state. At this point, from the time transistor 58 turns off, a time delay equal to the time constant of the RC integrating circuit 59 must elapse before the switching transistor SW returns to the on state and the charging of rechargeable battery B is resumed.

In the initial stages of charging, battery voltage drops immediately below the first prescribed voltage V1 when charging is suspended. However, a delay time equal to the time constant of the RC integrating circuit 59 is required before the switching transistor SW can switch to the on state. In other words, a minimum time corresponding to the time constant of the RC integrating circuit 59 is allotted for the interval over which charging is suspended.

When charging is resumed, the voltage of rechargeable battery B again exceeds the first prescribed voltage V1, and as previously described, charging is again suspended after a prescribed time interval has elapsed. Subsequently, charging and suspension of charging are performed repeatedly so as to pulse charge the rechargeable battery B.

Since the constant current source 55 produces a current proportional to the voltage of rechargeable battery B, the previously mentioned prescribed time interval is inversely proportional to battery voltage. As a result, as charging progresses and battery voltage increases, charging time becomes shorter and the intervals of suspended charging become longer. Therefore, as the rechargeable battery B approaches full charge, its exposure to high voltage is further restrained effectively preventing battery degradation.

In the circuit shown in FIG. 5, by connecting a zener diode in the reverse biased direction between the positive terminal of rechargeable battery B and the base terminal of transistor 58, over-voltage charging protection can be achieved for battery B. Specifically, if an over-voltage is applied to rechargeable battery B due to a circuit malfunction such as a DC power supply 51 malfunction, the zener diode and transistor 58 will turn on, switching transistor SW will turn off, and charging of battery B will be prevented.

This same result can also be achieved by connecting a forward biased diode between the negative terminal of rechargeable battery B and the base terminal of transistor 58.

As described above, the present invention suspends charging after charging a rechargeable battery with only a given amount of charge. During the period of suspended charging, when battery voltage drops to or below the first prescribed voltage V1, charging is resumed. Subsequently, this procedure is performed repeatedly so that pulse charging is accomplished.

As shown in FIG. 1, periods of suspended charging gradually lengthen as charging progresses in the method of the present invention. Therefore, the average charging current gradually decreases as charging progresses. Consequently, the state of charge of the rechargeable battery can be established by measuring the average charging current. It is possible to use this information to display the amount of charge or to determine when full charge is reached.

Finally, the state of charge of the rechargeable battery can also be established based on battery voltage measurements made during the period of suspended charging. The state of charge of the rechargeable battery can also be established for the case of constant voltage charging during the period of suspended charging by measuring the charging current during constant voltage charging.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A method of charging a rechargeable battery comprising:
   pulse charging the rechargeable battery by
      detecting battery voltage of the rechargeable battery,
      determining whether the battery voltage is equal to or less than a first prescribed voltage,
      charging the battery by applying a predetermined amount of charge to the battery when the battery voltage is determined to be equal to or less than the first prescribed voltage, wherein the predetermined amount of charge is based on an amount of charging current and a pulse time period, and
      suspending charging of the battery after the predetermined amount of charge has been applied to the battery,
   wherein the detecting, determining, charging, and suspending are sequentially performed a plurality of times, the first prescribed voltage is the same each of the plurality of times, and the predetermined amount of charge is the same each of the plurality of times.

2. A method of charging a rechargeable battery as claimed in claim 1, wherein the predetermined amount of charge is less than or equal to 10% of a full charge capacity of the rechargeable battery.

3. A method of charging a rechargeable battery as claimed in claim 1, wherein the predetermined amount of charge is less than or equal to 5% of a full charge capacity of the rechargeable battery.

4. A method of charging a rechargeable battery as claimed in claim 1, wherein the predetermined amount of charge is less than or equal to 1% of a full charge capacity of the rechargeable battery.

5. A method of charging a rechargeable battery as claimed in claim 1, wherein the charging of the battery with a predetermined amount of charge is performed only if the battery voltage is determined to be equal to or less than the first prescribed voltage and a prescribed time period has elapsed within which the battery has not been charged.

6. A method of charging a rechargeable battery as claimed in claim 1, wherein the first prescribed voltage is decreased when ambient temperature increases.

7. A method of charging a rechargeable battery as claimed in claim 1, wherein the predetermined amount of charge is decreased when ambient temperature increases.

8. A method of charging a rechargeable battery as claimed in claim 1, further comprising:
preventing charging when the battery voltage is determined to be greater than or equal to a maximum prescribed voltage which is greater than the first prescribed voltage.

9. A method of charging a rechargeable battery as claimed in claim 8, wherein the rechargeable battery is a lithium ion rechargeable battery and the maximum prescribed voltage is 4.35V/cell.

10. A method of charging a rechargeable battery as claimed in claim 8, wherein the maximum prescribed voltage is decreased when ambient temperature increases.

11. A method of charging a rechargeable battery as claimed in claim 1, further comprising:
constant-voltage charging the battery when the battery voltage is determined to be greater than or equal to a maximum prescribed voltage which is greater than the first prescribed voltage.

12. A method of charging a rechargeable battery as claimed in claim 11, wherein the rechargeable battery is a lithium ion rechargeable battery and the maximum prescribed voltage is 4.35V/cell.

13. A method of charging a rechargeable battery as claimed in claim 11, wherein the maximum prescribed voltage is decreased when ambient temperature increases.

14. A method of charging a rechargeable battery as claimed in claim 1, further comprising:
prior to the pulse charging of the rechargeable battery, constantly charging the battery until the battery voltage reaches a second prescribed voltage, wherein the pulse charging of the battery is performed only after the battery reaches the second prescribed voltage.

15. A method of charging a rechargeable battery as claimed in claim 14, wherein the first prescribed voltage and the second prescribed voltage are equal.

16. A method of charging a rechargeable battery as claimed in claim 14, wherein the second prescribed voltage is greater than the first prescribed voltage.

17. A method of charging a rechargeable battery as claimed in claim 16, wherein the rechargeable battery is a lithium ion rechargeable battery and the first prescribed voltage is 4.10V/cell.

18. A method of charging a rechargeable battery as claimed in claim 14, wherein the rechargeable battery is a lithium ion rechargeable battery and the second prescribed voltage is 4.15V/cell.

19. A method of charging a rechargeable battery as claimed in claim 14, wherein second prescribed voltage is decreased when ambient temperature increases.

20. A method of charging a rechargeable battery comprising:
pulse charging the rechargeable battery by detecting battery voltage of the rechargeable battery,
determining whether the battery voltage is equal to or less than a first prescribed voltage,
charging the battery by applying an amount of charge to the battery when the battery voltage is determined to be equal to or less than the first prescribed voltage, wherein the amount of charge is based on an amount of charging current and a pulse time period and wherein the pulse time period is based on the detected battery voltage, and
suspending charging of the battery after the amount of charge has been applied to the battery,
wherein the detecting, determining, charging, and suspending are sequentially performed a plurality of times such that the battery voltage gradually increases, the first prescribed voltage is the same each of the plurality of times, and the amount of charge is gradually reduced by reducing the pulse time period each of the plurality of times so that the pulse time period is inversely proportional to the battery voltage as the battery voltage gradually increases.

21. A method of charging a rechargeable battery as claimed in claim 20, wherein the charging of the battery with an amount of charge is performed only if the battery voltage is determined to be equal to or less than the first prescribed voltage and a prescribed time period has elapsed within which the battery is not charged.

22. A method of charging a rechargeable battery as claimed in claim 20, wherein the first prescribed voltage is decreased when ambient temperature increases.

23. A method of charging a rechargeable battery as claimed in claim 20, wherein the amount of charge is decreased when ambient temperature increases.

24. A method of charging a rechargeable battery as claimed in claim 20, further comprising:
preventing charging when the battery voltage is determined to be greater than or equal to a maximum prescribed voltage which is greater than the first prescribed voltage.

25. A method of charging a rechargeable battery as claimed in claim 24, wherein the rechargeable battery is a lithium ion rechargeable battery and the maximum prescribed voltage is 4.35V/cell.

26. A method of charging a rechargeable battery as claimed in claim 24, wherein the maximum prescribed voltage is decreased when ambient temperature increases.

27. A method of charging a rechargeable battery as claimed in claim 20, further comprising:
constant-voltage charging the battery when the battery voltage is determined to be greater than or equal to a maximum prescribed voltage which is greater than the first prescribed voltage.

28. A method of charging a rechargeable battery as claimed in claim 27, wherein the rechargeable battery is a lithium ion rechargeable battery and the maximum prescribed voltage is 4.35V/cell.

29. A method of charging a rechargeable battery as claimed in claim 27, wherein the maximum prescribed voltage is decreased when ambient temperature increases.

30. A method of charging a rechargeable battery as claimed in claim 20, further comprising:
prior to the pulse charging of the rechargeable battery, constantly charging the battery until the battery voltage reaches a second prescribed voltage, wherein the pulse charging of the battery is performed only after the battery reaches the second prescribed voltage.

31. A method of charging a rechargeable battery as claimed in claim 30, wherein the first prescribed voltage and the second prescribed voltage are equal.

32. A method of charging a rechargeable battery as claimed in claim 30, wherein the second prescribed voltage is greater than the first prescribed voltage.

33. A method of charging a rechargeable battery as claimed in claim 32, wherein the rechargeable battery is a lithium ion rechargeable battery and the first prescribed voltage is 4.10V/cell.

34. A method of charging a rechargeable battery as claimed in claim 30, wherein the rechargeable battery is a lithium ion rechargeable battery and the second prescribed voltage is 4.15V/cell.

35. A method of charging a rechargeable battery as claimed in claim 30, wherein second prescribed voltage is decreased when ambient temperature increases.

* * * * *